(12) United States Patent
Chastan et al.

(10) Patent No.: US 9,484,703 B2
(45) Date of Patent: Nov. 1, 2016

(54) GAS CIRCULATION LOOP FOR A LASER DISCHARGE TUBE

(71) Applicant: EXCICO FRANCE, Gennevilliers (FR)

(72) Inventors: Nicolas Chastan, Gennevilliers (FR); Julien Grellet, Gennevilliers (FR)

(73) Assignee: LASER SYSTEMS AND SOLUTIONS OF EUROPE, Gennevilliers (FR)

( * ) Notice: Subject to any disclaimer, the term of this patent is extended or adjusted under 35 U.S.C. 154(b) by 0 days.

(21) Appl. No.: 14/430,305

(22) PCT Filed: Sep. 24, 2013

(86) PCT No.: PCT/EP2013/069801
§ 371 (c)(1),
(2) Date: Mar. 23, 2015

(87) PCT Pub. No.: WO2014/044866
PCT Pub. Date: Mar. 27, 2014

(65) Prior Publication Data
US 2015/0244136 A1  Aug. 27, 2015

(30) Foreign Application Priority Data
Sep. 24, 2012  (EP) .................................... 12290317

(51) Int. Cl.
*H01S 3/036* (2006.01)
*H01S 3/03* (2006.01)
*H01S 3/041* (2006.01)

(52) U.S. Cl.
CPC ................. *H01S 3/036* (2013.01); *H01S 3/03* (2013.01); *H01S 3/041* (2013.01)

(58) Field of Classification Search
CPC ....................................................... H01S 3/036

USPC ............................................................ 372/58
See application file for complete search history.

(56) References Cited

U.S. PATENT DOCUMENTS 3,577,096 A * 5/1971 Bridges ................. H01S 3/0971
327/602

(Continued)

FOREIGN PATENT DOCUMENTS

DE  199 36 955 A1  2/2001
FR  2 718 894 A1  10/1995

(Continued)

OTHER PUBLICATIONS

International Search Report, dated Jan. 30, 2014, from corresponding PCT application.

*Primary Examiner* — Tod T Van Roy
(74) *Attorney, Agent, or Firm* — Young & Thompson

(57) ABSTRACT

The gas circulation loop for a laser discharge tube includes a gas supply duct (a) and a gas exhaust duct (c), wherein the gas supply duct (a) and/or the gas exhaust duct (c) is elongated in the longitudinal direction of the laser discharge tube (b) and connected to the laser discharge tube (b) by an inlet flow distributor and, respectively an outlet flow distributor, adapted for controlled transversal gas inlet and, respectively outlet, over at least part of the laser discharge tube (b), and wherein the inlet flow distributor and/or the outlet flow distributor include a plurality of respective inlet channels or outlet channels, characterized in that the ratio between the diameter of the gas supply duct (a) and the diameter of the inlet channels, and/or the ratio between the diameter of the gas exhaust duct (c) and the diameter of the outlet channels is at least 2. A laser apparatus including such gas circulation loop is also described.

8 Claims, 7 Drawing Sheets

(56) References Cited

U.S. PATENT DOCUMENTS

| | | | | |
|---|---|---|---|---|
| 3,720,885 A | * | 3/1973 | Koloc | H01S 3/0979 313/329 |
| 4,156,207 A | * | 5/1979 | Reilly | H01S 3/0979 372/58 |
| 4,470,144 A | | 9/1984 | Sano et al. | |
| 4,651,325 A | * | 3/1987 | Wang | H01S 3/0315 372/58 |
| 4,704,719 A | * | 11/1987 | Weiss | 372/58 |
| 4,835,784 A | * | 5/1989 | Gurs | H01S 3/0975 372/58 |
| 5,898,723 A | | 4/1999 | Le Guyadec et al. | |
| 6,473,445 B1 | | 10/2002 | Zeller | |

FOREIGN PATENT DOCUMENTS

| | | |
|---|---|---|
| GB | 2 163 896 A | 3/1986 |
| JP | 61 230386 A | 10/1986 |

* cited by examiner

GAS CIRCULATION LOOP FOR A LASER DISCHARGE TUBE

FIELD OF THE INVENTION

The present invention relates to a gas circulation loop for a laser discharge tube, and to a laser apparatus comprising such gas circulation loop.

BACKGROUND OF THE INVENTION

Pulsed high pressure discharge pumped gas lasers, for example excimer lasers or transversely-excited atmospheric (TEA) CO2 lasers, require a gas recirculation loop to cool and renew the gas in the discharge area between each pulse to obtain a stable and homogeneous irradiation beam.

An example is found in FR2718894 A1, wherein a gas circulation loop is described mounted in line with the discharge area (see FIG. 1). A drawback of this design is that, since the gas is renewed in axial direction to the discharge tube, the homogeneity of the gas along the full length of the discharge area cannot be guaranteed.

Moreover, gas renewal in axial direction over the full length of the discharge tube occurs insufficiently fast when operating at high pulse rates.

Another example of a gas circulation loop, which alleviates the above problem is shown in FIG. 2. This well-known type of gas circulation loop is a wind tunnel type circulation loop renewing the gas in transversal direction to the discharge area.

A disadvantage of a wind tunnel type circulation loop is that, using traditional design rules of aerodynamic wind tunnels to create the required gas flow speed and gas flow homogeneity, it can have a rather large size. Particularly, when using it for discharge tube volumes up to 2 m×0.1×0.1 m, the design rules can lead to such extremely large sizes that incompatibility with industrial environment may become a problem.

Another already more compact type of a gas circulation loop renewing the gas in transversal direction and designed for improving homogeneity of the gas along the full length of the discharge area is disclosed in DE 199 36 955. It comprising a gas supply duct and a gas exhaust duct elongated in the longitudinal direction of the laser discharge tube and comprises a number of respective inlet channels and outlet channels. However, homogeneous renewal of the gas in this design is still not satisfying, in particular not for high pulse rates.

Considering the above drawbacks, it is an object of the present invention to provide a gas circulation loop even more improving homogeneity of the gas along the full length of the discharge area.

Another object is to provide a gas circulation loop enabling sufficiently fast gas renewal for operating at high pulse rates.

Further, it is an object of the present invention to provide a compact gas circulation loop that is acceptable in size for use in industrial environment, even in combination with very large discharge tubes.

SUMMARY OF THE INVENTION

The present invention is directed to gas circulation loop for a laser discharge tube comprising a gas supply duct and a gas exhaust duct, wherein the gas supply duct and/or the gas exhaust duct is elongated in the longitudinal direction of the laser discharge tube and connected to the laser discharge tube by an inlet flow distributor, respectively an outlet flow distributor, adapted for controlled transversal gas inlet, respectively outlet, over at least part of the laser discharge tube, and wherein the inlet flow distributor and/or the outlet flow distributor comprise a plurality of respective inlet channels or outlet channels, characterized in that the ratio between the diameter of the gas supply duct and the diameter of the inlet channels, and/or the ratio between the diameter of the gas exhaust duct and the diameter of the outlet channels is at least 2.

In a preferred embodiment, both the gas supply duct and the gas exhaust duct are elongated in the longitudinal direction of the laser discharge tube and connected to the laser discharge tube by an inlet flow distributor, respectively an outlet flow distributor, comprising a plurality of respective inlet channels or outlet channels, characterized in that the ratio between the diameter of the gas supply duct and the diameter of the inlet channels, and the ratio between the diameter of the gas exhaust duct and the diameter of the outlet channels is at least 2.

Further, the present invention is directed to a laser apparatus comprising such gas circulation loop.

DESCRIPTION OF THE INVENTION

In a first embodiment a gas circulation loop for a laser discharge tube is provided comprising a gas supply duct and a gas exhaust duct, wherein the gas supply duct and/or the gas exhaust duct is elongated in the longitudinal direction of the laser discharge tube and connected to the laser discharge tube by an inlet flow distributor, respectively an outlet flow distributor, adapted for controlled transversal gas inlet, respectively outlet, over at least part of the laser discharge tube, and wherein the inlet flow distributor and/or the outlet flow distributor comprise a plurality of respective inlet channels or outlet channels, characterized in that the ratio between the diameter of the gas supply duct and the diameter of the inlet channels, and/or the ratio between the diameter of the gas exhaust duct and the diameter of the outlet channels is at least 2.

It is surprisingly found that by making the ratio between the diameter of the gas supply duct and the diameter of the inlet channels, and/or the ratio between the diameter of the gas exhaust duct and the diameter of the outlet channels at least 2, a compact gas circulation loop according to the present invention allows proper control of the tradeoff between homogeneity of the transversal gas flow and the pressure drop in the circulation loop. Indeed, if this ratio is less than 2, it may be less easy to find a proper balance between the power of the blower required for circulating sufficient amounts of gas, the pressure drop generated at the exhaust side of the circulation loop, and the homogeneity of the gas flow over the full length of the laser discharge tube. In particular for high volume laser discharge tubes, e.g. up to 2 m×0.1×0.1 m, generating a large area output beam of more than 60 cm$^2$, more than 80 cm$^2$, preferably 100 cm$^2$, having a projected beam spot typically from 1 to 10 cm$^2$ with an energy density between 0.5 and 10 J/cm$^2$, such proper balancing is of critical importance.

Another advantage of a gas circulation loop in accordance with the present invention is that, gas enters the discharge area simultaneously over a large part, preferably over substantially the full length of the discharge area. This may result in gas renewal occurring faster compared to other designs, thereby enabling sufficiently fast gas renewal for operating at high pulse rates (also called repetition rates), up to 50 Hertz, or even up to 100 Hertz.

Figure 1:
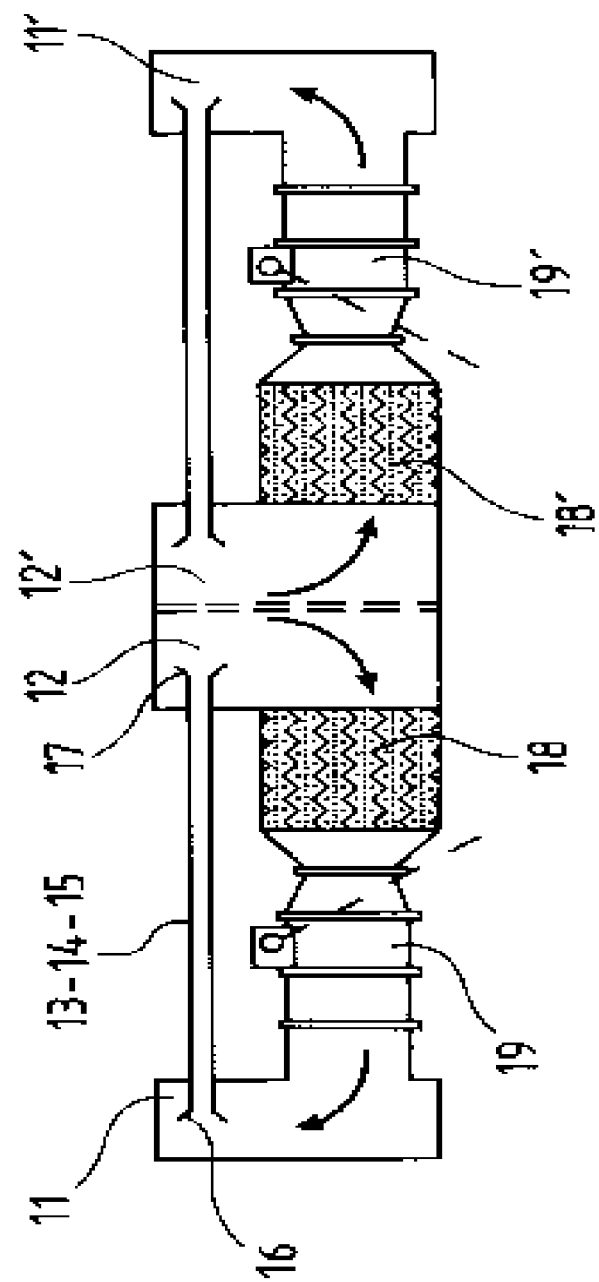
FIG. 1 illustrates an example of a state of the art gas circulation loop.
Figure 2:
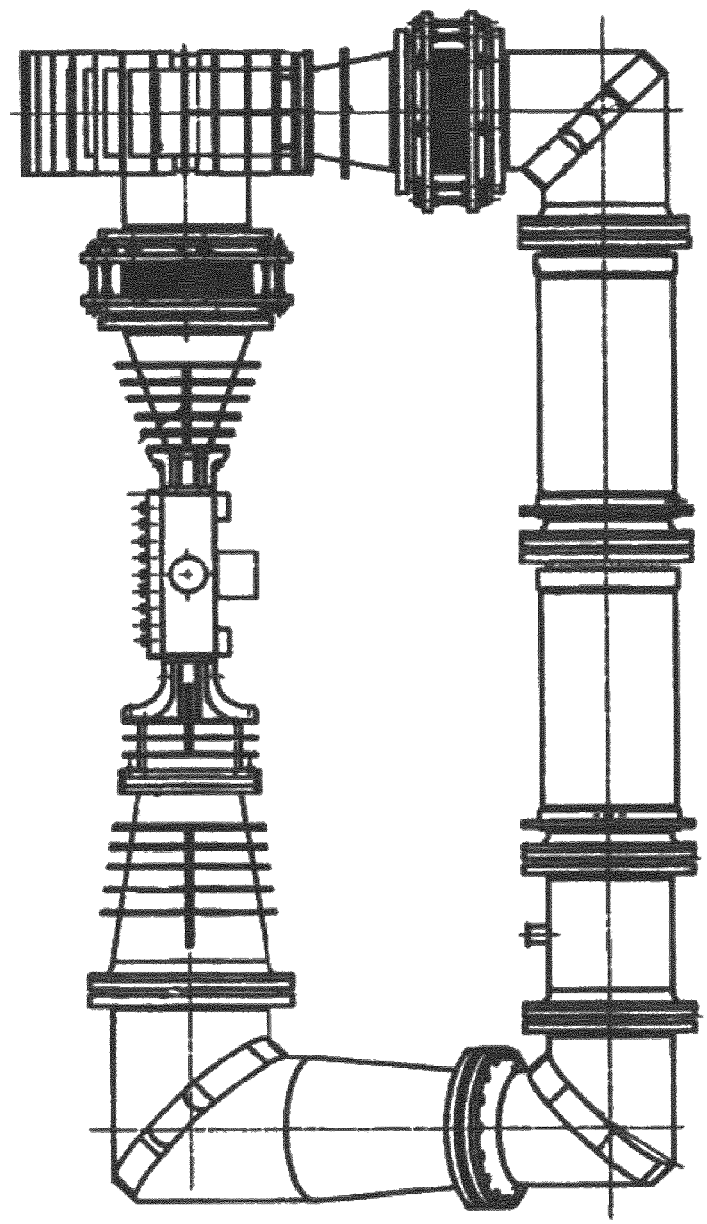
FIG. 2 illustrates another example of a state of the art gas circulation loop.
Figure 3:
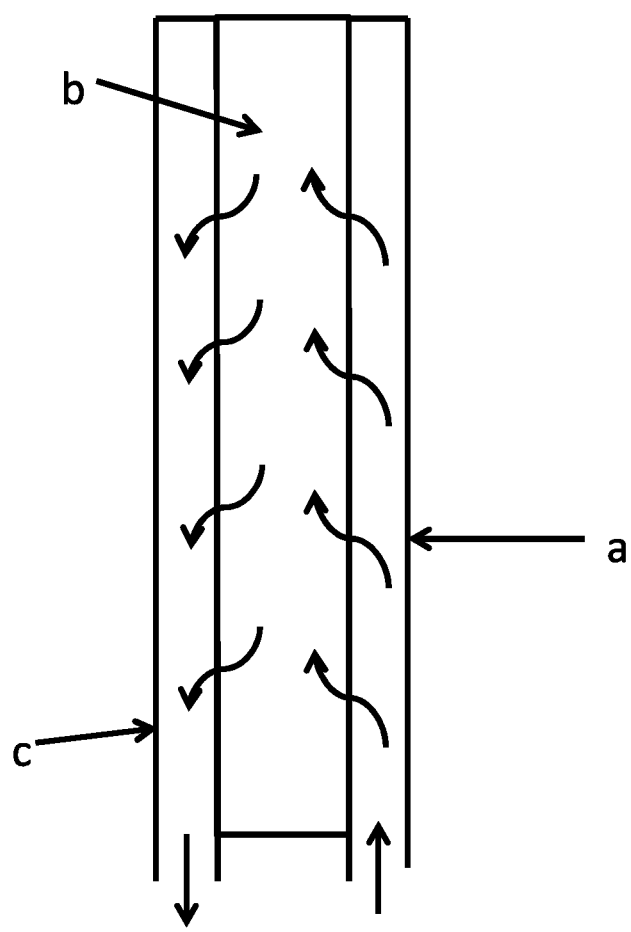
FIG. 3 schematically illustrates a first embodiment of a gas circulation loop in accordance with the present invention.

Still another advantage as particularly illustrated in FIG. 3 is that a gas circulation loop according to the present invention may be more compact compared to conventional designs. Because the gas supply duct is elongated in the longitudinal direction of the laser discharge tube it can be positioned very close to the discharge tube.

Preferably, also the gas exhaust duct (c) may be elongated in the longitudinal direction of the laser discharge tube, such that it can be positioned very close to the discharge tube (b) as well making the circulation loop still more compact.

Figure 4:
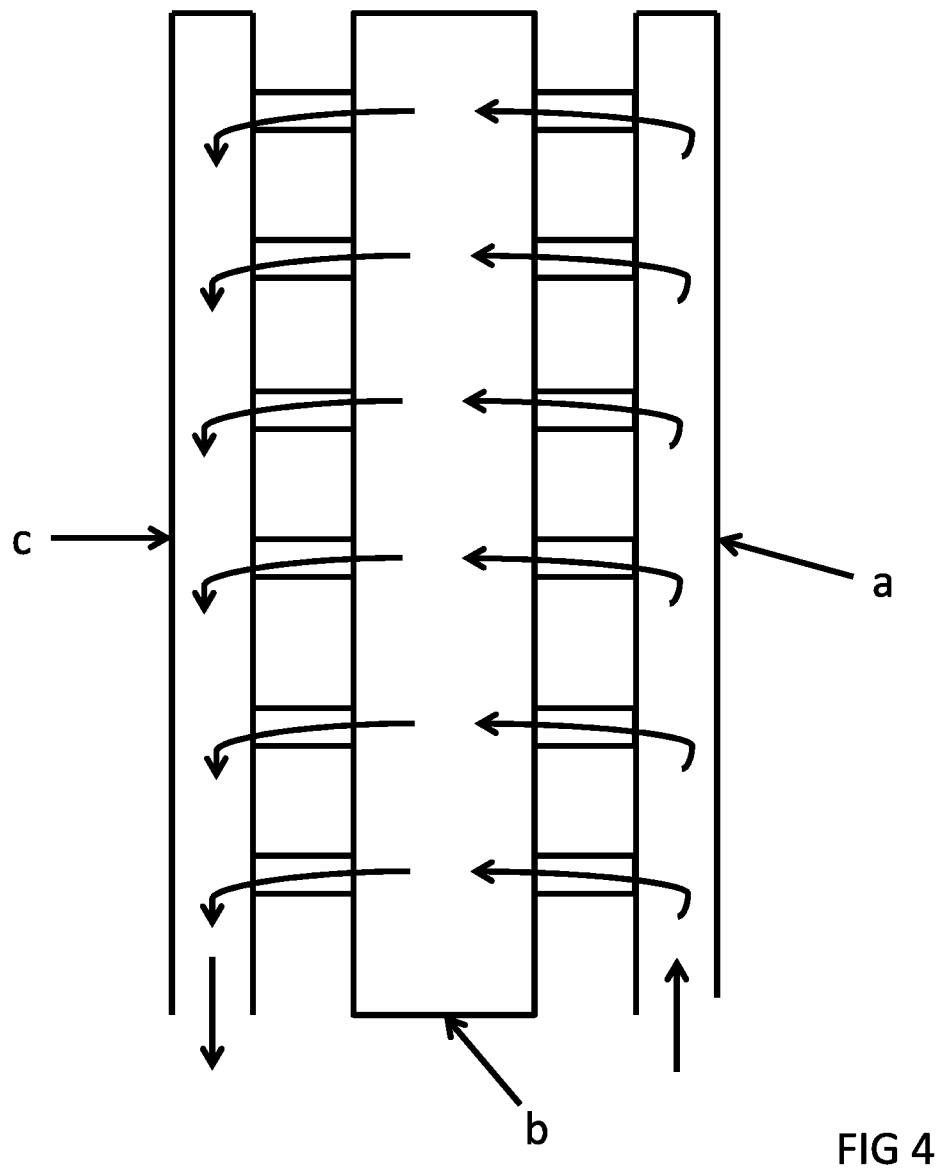
FIG. 4 schematically illustrates another embodiment of a gas circulation loop in accordance with the present invention.

In a preferred embodiment, the gas exhaust duct is adapted such that the gas leaves the laser discharge tube in the latter's transversal direction (see FIG. 3 and FIG. 4, arrows from (b) to (c)). This may improve the homogeneity of the gas in the discharge area, even along the full length of the discharge area. Preferably the gas exhaust duct is elongated over substantially the full length of the discharge area.

Additionally, by making the gas exhaust duct elongated in the longitudinal direction of the laser discharge tube and making the gas leaving the laser discharge tube in the latter's transversal direction, gas leaves the discharge area simultaneously over a large part, preferably over substantially the full length of the discharge area. This, in combination with a gas supply duct elongated in the longitudinal direction of the laser discharge tube, may result in significantly more efficient and faster gas renewal.

Figure 6:
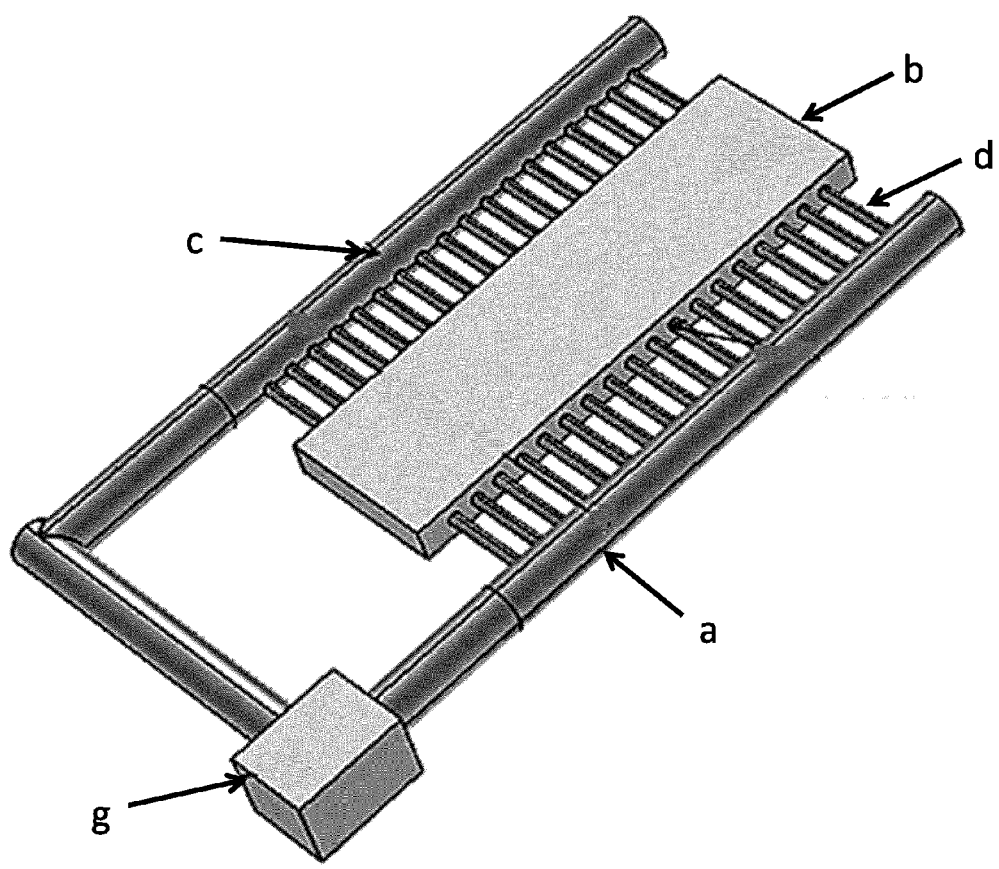
FIG. 6 illustrates a preferred embodiment of a gas circulation loop in accordance with the present invention.

In a preferred embodiment in accordance with the present invention and as illustrated in FIGS. 4 and 6, both the gas supply duct (a) and the gas exhaust duct (c) may be elongated in the longitudinal direction of the laser discharge tube (b), adapted for inducing transversal gas flow in the discharge tube and located at opposite sides of the laser discharge tube. This results in a gas circulation loop having a substantially flat configuration. In case the laser discharge tube has a flat rectangular cuboid form (i.e. a flat elongated box form as shown in FIG. 6), the circulation loop can be mounted in the same plane as the discharge tube, which may be beneficial with respect to compactness of the laser equipment and ease of assembling.

In an embodiment of a gas circulation loop in accordance with the present invention, the gas supply duct may be connected to the laser discharge by an inlet flow distributor adapted for controlled transversal gas inlet over at least part of the laser discharge tube.

In another embodiment, preferably in combination with the foregoing embodiment, the gas exhaust duct may be connected to the laser discharge tube by a flow distributor adapted for controlled transversal gas outlet over at least part of the laser discharge tube.

Such inlet or outlet flow distributor may comprise any means for distributing, mixing or homogenizing a gas and/or controlling its flow rate and flow distribution.

Figure 5:
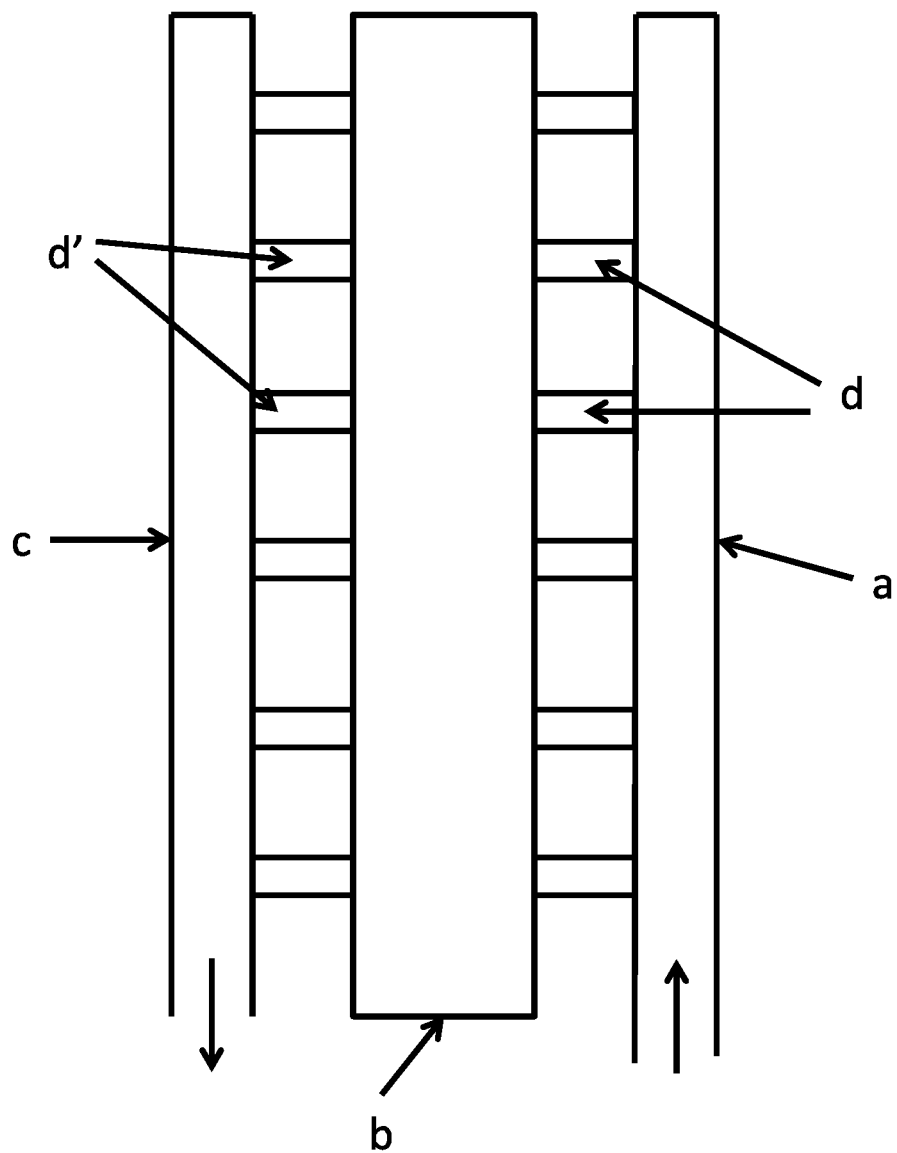
FIG. 5 schematically illustrates a detail of an embodiment of a gas circulation loop in accordance with the present invention.

In an embodiment in accordance with the present invention and as illustrated in FIG. 5, the inlet and/or outlet flow distributor may comprise a plurality of respective inlet channels (d) or outlet channels (d'). These channels may be small tubes with specific length and diameter connecting the respective gas supply duct or gas exhaust duct to the laser discharge tube.

In particular, the ratio between the diameter of the gas supply duct and the diameter of the inlet channels, and/or the ratio between the diameter of the gas exhaust duct and the diameter of the outlet channels may be at least 2, or at least 3, or at least 4, or preferably at least 4.5, and more preferably at least 5.

The length of the inlet and outlet channels may vary between 0.25 and 2.5 times the gas supply duct diameter, and preferably between 0.5 and 1.5 times the gas supply duct diameter.

In alternative embodiments the inlet and/or the outlet channels may vary in length versus the distance away from the blower to influence the gas pressure, speed, or flow in de channels, resulting in a gas supply and/or exhaust duct which is indeed elongated in the longitudinal direction of the laser discharge tube but maybe not substantially parallel with it.

The number of inlet or outlet channels connecting the respective gas supply and gas exhaust duct to the laser discharge tube is determined by the size of the gas circulation loop, the size of the laser discharge tube, and the length of the gas supply and exhaust duct. For example, for discharge tube volumes of 2 m×0.1×0.1 m, 18 inlet channels (and/or 18 outlet channels) are gradually divided over the length of the discharge tube.

Preferably, the space between two consecutive channels may be approximately one channel diameter. In fact, the space between two consecutive channels may depend on the distance from the supply duct to the discharge area. Without being bound by any theory, if the distance is larger (the inlet channels are longer), then there is more room and time for the gas flow to sufficiently expand and consequently the space between two consecutive channels may be over one channel diameter.

In an alternative embodiment, the inlet channels or the outlet channels or both may be replaced by a porous or capillary material such as for example a ceramic material, metallic foam, a capillary thermosetting polymer or any material suitable for inducing longitudinal distribution and transverse homogenization of a gas.

In a further embodiment in accordance with the present invention, optionally in combination with any of the foregoing embodiments, the inlet flow distributor comprises a grid assembly extending in the longitudinal direction of the laser discharge tube. Such grid assembly may comprise any grid-like structure made from metal, polymer, etc. being suitable for improving distributing, mixing or homogenizing a gas and/or controlling its flow rate and flow distribution. Such grid-like structure may have a transparency adapted to achieve a desired gas distributing, mixing or homogenizing effect and/or a desired flow rate and flow distribution.

Figure 7:
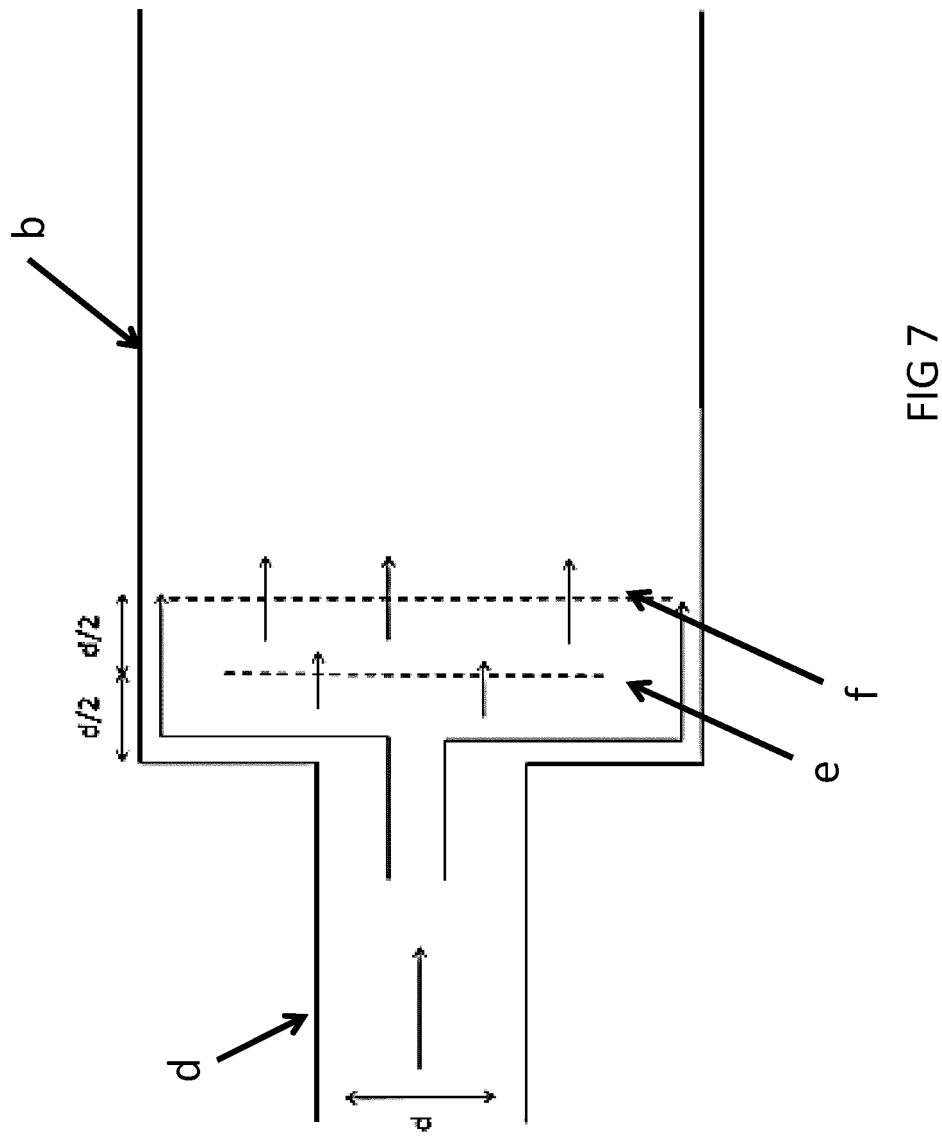
FIG. 7 schematically illustrates a cross-section of an embodiment of a gas circulation loop in accordance with the present invention comprising a number of grids of different transparency positioned consecutively in transverse direction.

In a preferred embodiment, the grid assembly comprises a number of grids (e, f) of different transparency positioned consecutively in transverse direction, as illustrated in FIG. 7.

A grid assembly of two consecutive grids may comprise a first grid (e) with higher transparency and a second grid (f) with lower transparency, wherein the gas flow crosses the higher transparency grid first. The higher transparency grid may have an opening ratio of at least 50%, at least 60%, preferably at least 70%, and more preferably at least 80%, while the lower transparency grid may have an opening ratio of less than 50%, less than 60%, preferably less than 70. For example the transparency of the higher transparency grid and the lower transparency grid may be respectively 83% and 27%.

The grid assembly may be mounted between the gas supply duct and laser discharge tube, or may be mounted inside the laser discharge tube.

In case the gas flow distributor comprises inlet channels, the grid assembly may be configured as one piece comprising one or more grids and mounted between the exit of the channels and the laser discharge tube. It may also be mounted at the inside of the laser discharge tube. Alternatively, the grid assembly may also be configured as separated assembly pieces, each piece comprising one or a plurality of grids mounted in each inlet channel, or between each channel and the laser discharge tube, preferably at the exit thereof.

Further as illustrated in FIG. 6, a gas circulation loop according to the present invention may comprise a blower (g) connecting the gas supply duct and the gas exhaust duct. Preferably, the plane connects the gas supply duct and the gas exhaust duct in a plane defined by the longitudinal direction of the laser discharge tube and the longitudinal direction of the gas supply duct. This results in a gas circulation loop having a substantially flat configuration. In case the laser discharge tube has a flat rectangular cuboid form (i.e. a flat elongated box form), the blower can be mounted in the same plane as the discharge tube, which may be beneficial with respect to compactness of the laser equipment and ease of assembling.

The power of the blower may be adapted and determined based on and in combination with proper choice of design parameters of the whole circulation loop, such as size, geometry, transparency of the flow distributors, etc. in order to properly control the tradeoff between homogeneity of the transversal gas flow and the pressure drop in the circulation loop.

In addition, the present invention provides a laser apparatus comprising a gas circulation loop according to any of the above embodiments.

A circulation loop in accordance with the present invention may be very useful particularly for high energy laser equipment requiring an X-ray generator for discharge pre-ionization, since due its specific design it is compatible with an X-ray generator and provides free access to both sides of the laser discharge tubes on the electrodes sides.

Additionally, the design is sufficiently flexible to modify fundamental parameters at the laser itself to control and modify the discharge.

A laser apparatus comprising a gas circulation loop according to the present invention may be any type of laser requiring gas renewal, such as for example pulsed high pressure discharge pumped gas lasers, for example excimer lasers or transversely-excited atmospheric (TEA) CO2 lasers.

The laser energy may be in the range of 5 Joules to 25 Joules. In order to achieve these energies, the laser discharge volume is optimized to typically 10 cm (inter electrodes spacing)×7 to 10 cm (discharge width)×100 to 200 cm (discharge length).

In an embodiment of the present invention, the laser may be adapted to produce a projected laser beam with an energy density between 0.5 and 10 $J/cm^2$.

In a preferred embodiment, the laser may be an excimer laser adapted to produce a large area output beam of more than 60 $cm^2$, more than 80 $cm^2$, preferably 100 $cm^2$, having a projected beam spot typically from 1 to 10 $cm^2$ with an energy density between 0.5 and 10 $J/cm^2$.

The invention claimed is:

1. A gas circulation loop for a laser discharge tube having a flat rectangular cuboid form, comprising:
   a gas supply duct; and
   a gas exhaust duct,
   wherein the gas supply duct and/or the gas exhaust duct is elongated in a longitudinal direction of the laser discharge tube,
   the gas supply duct being connected to the laser discharge tube by an inlet flow distributor adapted for controlled transversal gas inlet, and/or respectively the gas exhaust duct being connected to the laser discharge tube by an outlet flow distributor, adapted for controlled transversal gas outlet, over at least part of the laser discharge tube,
   the inlet flow distributor and/or the outlet flow distributor comprised of a plurality of respective inlet channels or outlet channels,
   wherein the gas circulation loop has a planar configuration,
   the gas supply duct and the gas exhaust duct being located at two opposite sides of the laser discharge tube,
   the gas circulation loop providing free access to both sides of the laser discharge tube on electrodes sides,
   said inlet channels or outlet channels each having lengths between 0.25 and 2.5 times a diameter of the gas supply duct,
   a spacing between two consecutive inlet channels being equal to or greater than a diameter of one inlet channel, and/or, respectively, a spacing between two consecutive outlet channels being equal to or greater than a diameter of one outlet channel,
   the plurality of respective inlet channels and/or outlet channels being gradually divided over the length of the discharge tube, and
   a ratio between a diameter of the gas supply duct and a diameter of the inlet channels, and/or a ratio between a diameter of the gas exhaust duct and a diameter of the outlet channels being at least 2.

2. The gas circulation loop according to claim 1, wherein the gas supply duct is positioned in parallel with the longitudinal direction of the laser discharge tube.

3. The gas circulation loop according to claim 1, wherein the gas exhaust duct is positioned in parallel with the longitudinal direction of the laser discharge tube.

4. The gas circulation loop according to claim 1, wherein the inlet flow distributor and/or the gas outlet distributor comprise a porous or capillary material.

5. The gas circulation loop according to claim 1, wherein the inlet flow distributor comprises a grid assembly extending in the longitudinal direction of the laser discharge tube.

6. The gas circulation loop according to claim 5, wherein the grid assembly comprises a number of grids of different transparency positioned consecutively in transverse direction.

7. The gas circulation loop according to claim 1, wherein a blower connects the gas supply duct and the gas exhaust duct in a plane defined by the longitudinal direction of the laser discharge tube and a longitudinal direction of the gas supply duct.

8. A laser apparatus comprising a gas circulation loop according to claim 1.

* * * * *